United States Patent
Pelzer

(10) Patent No.: US 11,468,678 B2
(45) Date of Patent: Oct. 11, 2022

(54) METHOD AND SYSTEM FOR LIVE DETERMINING OF A SPORTS DEVICE

(71) Applicant: Frank Pelzer, Templin (DE)

(72) Inventor: Frank Pelzer, Templin (DE)

(73) Assignee: Frank Pelzer, Templin (DE)

( * ) Notice: Subject to any disclaimer, the term of this patent is extended or adjusted under 35 U.S.C. 154(b) by 0 days.

(21) Appl. No.: 16/062,318

(22) PCT Filed: Dec. 12, 2016

(86) PCT No.: PCT/DE2016/100575
§ 371 (c)(1),
(2) Date: Jun. 14, 2018

(87) PCT Pub. No.: WO2017/101905
PCT Pub. Date: Jun. 22, 2017

(65) Prior Publication Data
US 2018/0373938 A1 Dec. 27, 2018

(30) Foreign Application Priority Data
Dec. 15, 2015 (DE) .......................... 102015121854.2

(51) Int. Cl.
*G06V 20/40* (2022.01)
*A63F 13/65* (2014.01)
(Continued)

(52) U.S. Cl.
CPC ............ *G06V 20/42* (2022.01); *A63F 13/426* (2014.09); *A63F 13/5372* (2014.09);
(Continued)

(58) Field of Classification Search
CPC .... A63F 13/65; A63F 13/426; A63F 13/5372; G06K 9/00724; G06T 7/292; G06T 7/70; G06V 20/42
See application file for complete search history.

(56) References Cited

U.S. PATENT DOCUMENTS 6,394,895 B1 * 5/2002 Mino .................... A63F 13/005
273/139
8,858,313 B1 * 10/2014 Selfors .................. A63F 13/335
463/43
(Continued)

FOREIGN PATENT DOCUMENTS

CN 1300388 A 6/2001
CN 1457264 A 11/2003
(Continued)

OTHER PUBLICATIONS

International Search Report for PCT/DE2016/100575, ISA/EP, Rijswijk, NL, dated Feb. 22, 2017 with English translation.
(Continued)

*Primary Examiner* — John R Schnurr
(74) *Attorney, Agent, or Firm* — Harness, Dickey & Pierce, P.L.C.

(57) ABSTRACT

A method for live determining of a sports device by a system with a position monitoring system, a user device, and a central server device. The method has the following steps: determining a live position of a sports device in the region of a sports arena during a competition by the position monitoring system; during the competition, the sports device moves in the area of the sports arena according to the competition; detecting a user input via the user device; and, in the central server device; providing live position data for the sports device, providing position data for the sports device; providing test data indicating a test criterion assigned to the user-defined position selection; and determining whether the test criterion is satisfied, wherein the live position data and position data for the sports device are compared. Furthermore, the invention relates to a system for live determining of a sports device.

8 Claims, 2 Drawing Sheets

Figure 1:
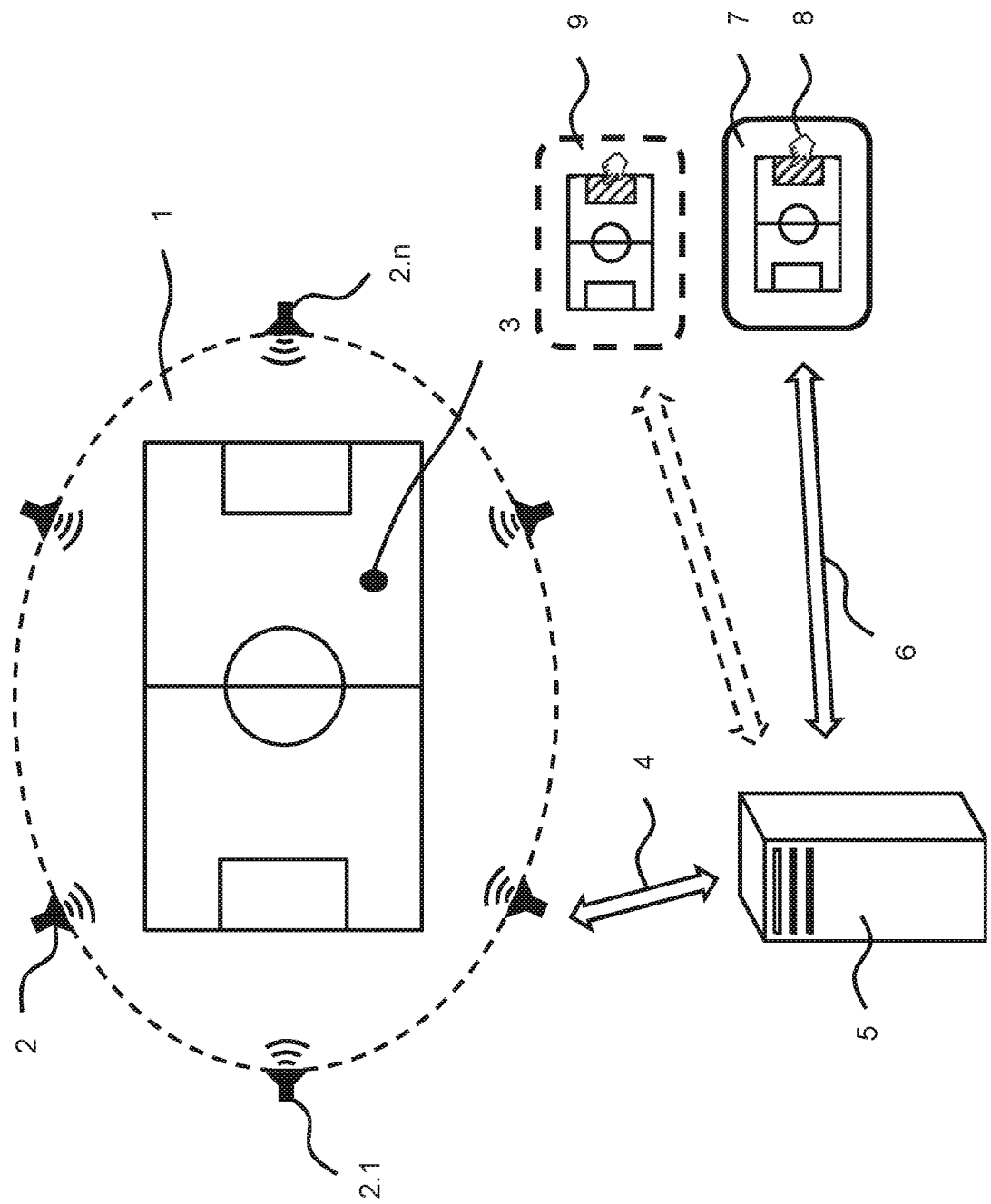

(51) Int. Cl.
 *A63F 13/426* (2014.01)
 *A63F 13/5372* (2014.01)
 *G06T 7/292* (2017.01)
 *G06T 7/70* (2017.01)

(52) U.S. Cl.
 CPC .............. *A63F 13/65* (2014.09); *G06T 7/292* (2017.01); *G06T 7/70* (2017.01)

(56) References Cited

U.S. PATENT DOCUMENTS

| | | |
|---|---|---|
| 2008/0021651 A1 | 1/2008 | Seeley et al. |
| 2008/0312010 A1 | 12/2008 | Marty et al. |
| 2010/0077422 A1* | 3/2010 | Bushinsky ......... H04N 7/17318 725/13 |
| 2010/0099471 A1* | 4/2010 | Feeney ................. G06Q 30/02 463/43 |
| 2013/0121538 A1* | 5/2013 | Daniels .................... G06T 7/20 382/107 |

FOREIGN PATENT DOCUMENTS

| | | |
|---|---|---|
| EP | 2945143 A1 | 11/2015 |
| JP | 2001137556 A | 5/2001 |
| TW | I263525 B | 10/2006 |
| WO | WO-2014-006143 A1 | 1/2014 |

OTHER PUBLICATIONS

Written Opinion of the ISA for PCT/DE2016/100575, ISA/EP, Rijswijk, NL, dated Feb. 22, 2017.
Chinese Office Action regarding application No. CN 201680074217.4, dated Jan. 22, 2021.

\* cited by examiner

METHOD AND SYSTEM FOR LIVE DETERMINING OF A SPORTS DEVICE

CROSSREFERENCE TO RELATED APPLICATIONS

This application is a 371 U.S. National Stage of International Application No. PCT/DE2016/100575, filed Dec. 12, 2016, which claims the benefit of German Patent Application No. DE 10 2015 121854.2, filed Dec. 15, 2015. The entire disclosures of the above applications are incorporated herein by reference.

The invention relates to a method and a system for live determining of a sports device.

BACKGROUND

It is known particularly in connection with football matches to determine the position of the match ball live during the match, particularly with the aid of a video monitoring system. Monitoring systems in which the match ball is provided with an RFID chip had also been suggested.

The detected position data for the sports device are used for example to create live animations and make the same available to users. For example, a method of this type is described in the document WO 2014/006143 A1.

SUMMARY

It is the object of the invention to specify a method and a system for live determining of a sports device, which enable an online interaction of a user with a position monitoring system for the sports device. The interaction should preferably be enabled live and in real time.

To achieve the object, a method and a system for live determining of a sports device according to the independent claims 1 and 8 are created. Alternative configurations are the subject matter of dependent sub-claims.

According to one aspect, a method is created for live determining of a sports device by means of a system. The system has a position monitoring system, a user device and a central server device which is functionally connected to the position monitoring system and the user device. The functional connection in particular enables unidirectional or directional data exchange. In the method, a live position of a sports device is determined in the region of a sports arena during a competition by means of the position monitoring system, wherein the sports device moves in a competition-dependent manner in the region of the sports arena during the competition. For example, it may be a football, the position of which in the region of the football pitch is determined live. Furthermore, a user input is detected by means of the user device, wherein the user input indicates a user-defined position selection for the sports device. In the central server device, live position data for the sports device, which indicate the live position of the sports device in the region of the sports arena, and position data for the sports device are provided, which indicate the user-defined position selection in the region of the sports arena. Furthermore, check data are provided in the central server device, which indicate a check criterion, which is assigned to the user-defined position selection. Whether the check criterion is fulfilled is determined in the central server device, wherein the live position data and the position data for the sports device are compared here.

According to a further aspect, a system is created for live determining of a sports device. The system has a positioning monitoring system which is set up to determine a position of a sports device in the region of a sports arena live. Furthermore, the system has a user device, which is set up to detect user inputs, and a central server device, to which the position monitoring system and the user device are functionally connected. The system is set up for executing the following steps: determining a live position of the sports device in the region of the sports arena during a competition by means of the position monitoring system, wherein the sports device moves in a competition-dependent manner in the region of the sports arena during the competition; detecting a user input by means of the user device, wherein the user input indicates a user-defined position selection for the sports device. The following steps are executed in the central server device: providing live position data for the sports device, which indicate the live position of the sports device in the region of the sports arena; providing position data for the sports device, which indicate the user-defined position selection in the region of the sports arena; providing check data, which indicate a check criterion which is assigned to the user-defined position selection; and determining whether the check criterion is fulfilled, wherein the live position data and the position data for the sports device are compared here.

The suggested technologies make it possible to compare the position of the sports device in the region of the sports arena on the one hand and the position selection for the sports device specified by the user on the other hand with one another once or multiple times live and optionally in real time. The technologies can for example be used in connection with an online gaming system or an online betting system.

The provision and/or processing analysis of the live position data for the sports device and the position data for the sports device can alternatively be executed at least to some extent in a client device of the system, which can optionally be formed in the user device.

In an embodiment, it can be provided to detect user-defined position selections for a plurality of users by means of the same or various user devices which couple to the central server device in each case. The position selection detected in each case may be different for the different users. Alternatively or additionally, identical or different check criteria can be provided for the various user-defined position selections. The respective user selection can also be determined on the basis of one and the same check criterion. For example, it is possible to check which user-defined position selection from a group of various user-defined position selections occurs first, last, at a particular time or within a specified time interval, such that the live position of the sports device fulfils the check criterion in connection with the user-defined position selection.

Depending on the sports arena in which the live position is determined, for example a stadium, racecourse, ski slope or indoor hall, and the event which is observed live, one may be concerned with different sports devices, for example a match ball, racing car, motorcycle or ski.

In the case of the use of the technology in connection with a games console, with which the user device can be provided, the user input can be detected by means of the games console for determining the user-defined position selection, in that the position of a playing device, for example a racing car, controlled by the user by means of the games console is determined, for example by means of the control device of the games console. The user determines their position selection for the sports device by operating the games console. The position data may correspond to the position of the racing car on the (game) racecourse at a time which can optionally be determined by the user. Something similar can alternatively be provided in connection with an online game.

The user-defined position selection may indicate a section inside and/or outside of markings, for example markings of a pitch or a racecourse in the sports arena, for the sports device. Alternatively or additionally to indicating a section of the sports arena, particularly a section of a pitch or a racecourse in the sports arena, the user-defined position selection can indicate a local (point) region inside and/or outside of the markings in the sports arena. The markings can comprise a user-defined marking which is defined by the user in the region of the sports arena, for example in that the user makes a marking input by means of the user device, for example by means of the definition of a line on the football pitch or the track of the racecourse. A region (area) can also be defined by means of user input. In connection with a football pitch, the user-defined position selection may for example relate to a penalty area and/or a half of the pitch. However, the goal line and/or a side line can also be defined by means of the user-defined position selection. The check criterion can then specify whether the football should lie inside or outside the region. In this manner, the user can for example select the region of the penalty area for the possible positions of the football.

The check criterion may comprise a temporal check criterion. The temporal check criterion can for example determine the time inside which the sports device shall reach the location or the region of the user-defined position selection. In one embodiment, it may also be provided that the temporal check criterion specifies the time period over which the sports device should remain outside of the location or the region of the sports arena, which is determined by means of the user-defined position selection.

The temporal check criterion can specify a time period and the comparison of the live position data and the position data for the sports device can be executed within the time period. The comparison of the live position and the position data for the sports device can be executed once or multiple times within the time period. Continuous data comparison can be provided, wherein a comparison can then steadily be provided anew when current live position data are provided in the central server device. The live position data used for comparison can be provided, in this or other embodiments, by the position monitoring system itself. Alternatively, the live position data are determined in the central server device in that position monitoring signals, which are received from the position monitoring system, are monitored. The provision of the live position data can take place in real time. In this context, the comparison of the live position data and the position data can be executed once or multiple times in real time.

The temporal check criterion and can specify a check time, and the comparison of the live position data and the position data for the sports device can be executed at the check time.

The check criterion can comprise a user-defined check parameter which is detected in the context of the user input by means of the user device. The user-defined check parameter can determine the temporal check criterion in whole or in part. For example, the user can hereby determine the time within which the check criterion should be fulfilled in the comparison of the live position data and the position data for the sports device. Also, the user can determine a time for a comparison, for example three minutes after the user input.

A video monitoring system can be used as position monitoring system. Video monitoring systems for the determination of the position of a sports device are known as such in various embodiments. For example, the live position of a football is determined using the same in a football match. An RFID-based system (RFID-Radio Frequency Identification) may also be used.

The live position data and the position data can indicate a 2D position determination for the sports device in the region of a sports arena. Alternatively, a 3D position determination may be provided.

When detecting the user-defined position selection, a selection menu for selectable positions of the sports device can be output by means of a display device of the user device and a selection of one of the selectable positions by the user can be detected. Here, predetermined positions for the sports device can be provided to the user for selection. In connection with a football match, this may for example relate to a penalty area or a half of the pitch. Alternatively or additionally, the user can make a freely selectable position selection by means of their input, that is to say positions which are not determined by means of a predetermined selection menu.

Result check data, which indicate a result of the determination of the check criterion, can be provided in the central server device and/or the user device, particularly when being formed as a client. The result check data specify for example whether and when a live position and the user-defined position selection for the sports device match, that is to say the live position lies in the region of the user-defined position selection. It may be provided that the frequency of such a match within a predetermined time period is determined. The time period can be determined by means of the check criterion. Also, other frequency analyses or statistical analyses relating to the occurrence or non-occurrence of an event in connection with the comparison of the live position of the sports device and the user-defined position selection may be provided.

Additionally, the live position for a player in the region of the sports arena can be determined temporarily or perpetually live by means of the position monitoring system. The check criterion can determine that a comparison is executed for the live positions of the sports device and the player, in order for example to determine an encounter of the sports device and player in the region of the sports arena.

In connection with the system for live determining of a sports device, the previously explained alternative embodiments can correspondingly be provided.

DESCRIPTION OF EXEMPLARY EMBODIMENTS

Figure 2:
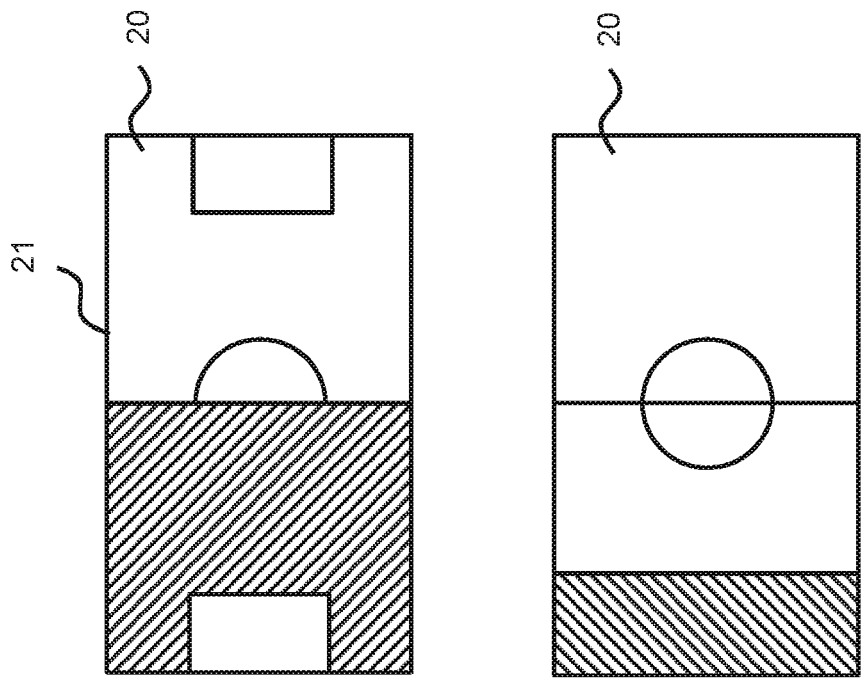
Figure 2:
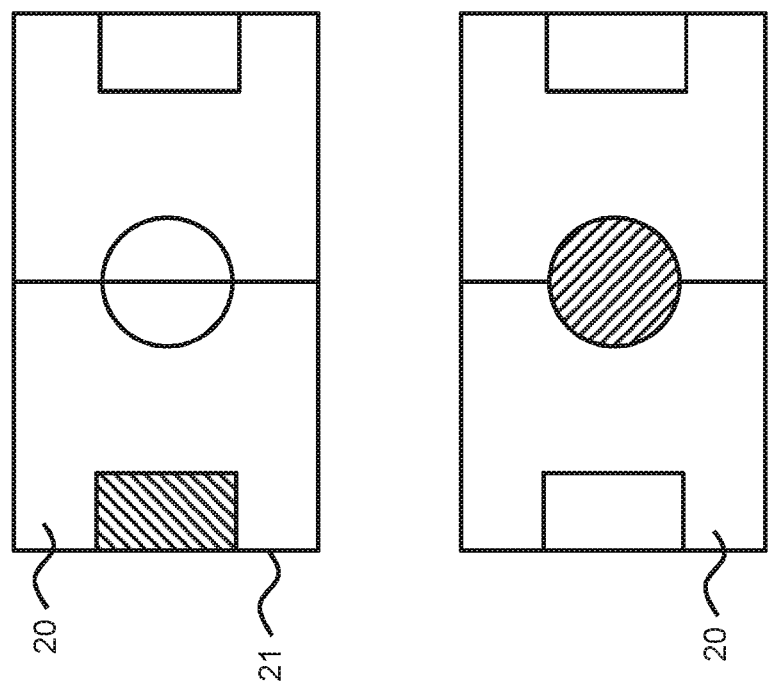

Further exemplary embodiments are explained in the following with reference to figures of a drawing. In the figures:

FIG. 1 shows a schematic illustration of a system for live determining of a sports device, and FIG. 2 shows schematic illustrations for a respective user-defined position selection on a pitch of a sports arena.

FIG. 1 shows a schematic block diagram of a system for live determining of a sports device. In the exemplary embodiment shown, a competition is taking place in the region of a sports arena 1 with a pitch, for example a football match or an American football match. In alternative embodiments, the sports arena may be a racecourse for cars or motorcycles. Also, a pool may be a sports arena in the sense understood here, for example for a water polo match. Alternatively, the sports arena may be formed in an indoor hall.

A position monitoring system 2 with a plurality of monitoring devices 2.1, ..., 2.n is used in order to determine the live position of a sports device 3 in the region of the sports arena 1 continuously during the competition. For example, the position monitoring system 2 can be formed as a video monitoring system. Monitoring systems of this type are known as such in various embodiments.

In the example shown, the sports device 3 is a match ball, for example a football or an American football. In other embodiments, for example in connection with the racecourse, cars or motorcycles form the sports devices, the position thereof during the monitoring time period is detected live by means of the position monitoring system 2.

The position monitoring system 2 couples to a central server device 5 via a wireless and/or wired connection 4, in order to exchange data.

The central server device 5 couples to a user device 7 via a further wireless and/or wired connection 6. The user device 7 may for example be a mobile telephone, a laptop computer, a tablet computer, a games console or a personal computer. The user device 7, which can be formed as a client of the central server device 5, makes it possible for the user to make user inputs, which is shown schematically in FIG. 1 on the basis of a symbol 8.

In one exemplary embodiment, live position data for the sports device 3 are generated, for example in the position monitoring system 2 itself and/or in the central server device 5, on the basis of the live monitoring of the position of the sports device 3. The live position data are provided in the server device 5, for example in real time.

Furthermore, a user input is detected at the user device 7, which indicates a user-defined position selection for the sports device 3. To this end, the pitch 1 may be illustrated schematically for the user on the user device 7, so that the user selects a region of the sports arena 1, for example in the case of the football match, one of the two penalty areas. The user input can be detected with the aid of a mouse, a keyboard, a games console, an eye tracker, speech input and/or with the aid of a touch-sensitive screen. For the user-defined position selection, position data are created in the user device 7 and then transmitted to the central server device 5.

In an alternative embodiment, the user-defined position selection may relate to a position along the racecourse, for example a stretch such as a bend or a carriageway marking such as the finish line.

In the central server device 5 and/or in the user device 7, the live position data and the position data are compared, particularly for determining whether and optionally when the live position of the sports device 3 lies in the region of the user-defined position selection, that is to say for example whether and optionally when the football enters into the penalty area selected by the user. In a different embodiment, it is possible to check for how long the football does not make it into the penalty area selected by the user. The form in which the comparison of live position data and position data for the sports device is to be analysed is determined by means of a check criterion. This can be detected in the context of the user input. Alternatively, the check criterion is determined in the central server device. A change of the user-defined check criterion can also be provided in the central server device.

For the comparison of live position data and position data for the sports device 3 in the context of the check criterion, result check data can be created in the central server device 5, which result check data can be transmitted to the user device 7 in order to display the result to the user by means of a display device of the user device 7.

The system shown in FIG. 1 has a further user device 9 which can be used by a different user in a manner comparable to the user device 7. In this manner, different user-defined position selections can be detected and processed in the central server device 5, in that the comparison with the live position data is executed. It is possible to check for example which of the user-defined position selections coincide first with the live position of the sports device 3. This information can for example be processed further in an online gaming system or an online betting system.

FIG. 2 shows a schematic illustrations for possible user-defined position selections in connection with a pitch 20 realized as a football pitch. The pitch 20 is defined by markings 21, which in particular comprise the goal line, side lines and penalty area lines. The user-defined position selection, which is shown schematically by means of shading, may relate to a region inside the pitch 20 and/or adjacent thereto. The position selection can take place, taking the markings 21 into account.

The features disclosed in the above description, the claims, and the drawing can be of significance both individually and in any combination for the implementation of the different embodiments.

The invention claimed is:

1. A method for live determining of a sports device by means of a system, which has a position monitoring system, a plurality of user devices and a central server device, to which the position monitoring system and the user device are functionally connected, wherein the method has the following steps:
   determining a live position of a sports device in a sports arena during a competition by means of a video monitoring system acting as the position monitoring system, wherein the video monitoring system is a system of cameras inside the sports arena and the sports device moves in a competition-dependent manner in the sports arena during the competition;
   for each of the plurality of user devices, detecting a user input by means of the user device, wherein the user input indicates an area of the sports arena and comprises user-specified position data for the sports device; and
   in the central server device,
   receiving live position data for the sports device from the video monitoring system, which indicate the live position of the sports device in the sports arena;
      receiving the user-specified position data from each of the plurality of user devices;
      providing temporal check criterion that specifies a time period in which the sports device is inside or outside the area of the sports arena;
      for each of the plurality of user devices, determining, by the central server device, whether the temporal check criterion is fulfilled, wherein the live position data and the respective user-specified position data are hereby compared; and
      determining which user-specified position data occurs first or last, such that the temporal check criterion is fulfilled.

2. The method according to claim 1, wherein the user-specified position data further indicates whether the sports device is to be inside or outside of the area of the sport arena.

3. The method according to claim 1, wherein the temporal check criterion specifies a check time and the comparison of the live position data and the user-specified position data is executed at the check time.

4. The method according to claim 1, wherein the temporal check criterion comprises a user-defined check parameter, which is detected in the context of the user input by means of the user device.

5. The method according to claim 1, wherein the live position data and the position data indicate a 2D position determination for the sports device in the area of the sports arena.

6. The method according to claim 1, wherein when detecting the user input, a selection menu for selectable positions of the sports device is output by means of a display device of the user device and a selection of one of the selectable positions by the user is detected.

7. The method according to claim 1, wherein result check data are provided in the central server device, which indicate a result of the determination of the check criterion.

8. A system for live determining of a sports device, with
- a position monitoring system is a system of cameras inside a sports arena, which is set up to determine a position of a sports device in the sports arena; and
- a central server device, to which the position monitoring system and a plurality of user devices are functionally connected;

wherein the system is set up for executing the following steps:
- determining a live position of the sports device in the sports arena during a competition by means of the position monitoring system, wherein the sports device moves in a competition-dependent manner in the sports arena during the competition;
- for each of the plurality of user devices, detecting a user input by means of the user device, wherein the user input indicates an area of the sports arena and comprises user-specified position data for the sports device; and
- in the central server device,
  - receiving live position data for the sports device from the position monitoring system, which indicate the live position of the sports device in the sports arena;
  - receiving the user-specified position data from each of the plurality of user devices;
  - providing temporal check criterion that specifies a time period in which the sports device is inside or outside the area of the sports arena;
  - for each of the plurality of user devices, determining whether the temporal check criterion is fulfilled, wherein the live position data and the respective user-specified position data are hereby compared; and
  - determining which user-specified position data occurs first or last, such that the temporal check criterion is fulfilled.

* * * * *